United States Patent
Buchan et al.

[19]

[11] Patent Number: 6,117,701
[45] Date of Patent: Sep. 12, 2000

[54] METHOD FOR MANUFACTURING A RATE-OF-ROTATION SENSOR

[75] Inventors: Nicholas Buchan; Horst Muenzel, both of Reutlingen; Franz Laermer, Stuttgart; Michael Offenberg, Kirchentellinsfurt; Udo Bischof, Wannweil; Markus Lutz, Reutlingen, all of Germany

[73] Assignee: Robert Bosch GmbH, Stuttgart, Germany

[21] Appl. No.: 08/907,601

[22] Filed: Aug. 8, 1997

[30] Foreign Application Priority Data

Aug. 9, 1996 [DE] Germany ............................ 196 32 060

[51] Int. Cl.[7] .............................. H01L 21/00; G01P 15/00
[52] U.S. Cl. .......................... 438/52; 438/53; 73/514.36; 73/514.37
[58] Field of Search ............................ 73/514.36, 514.37; 438/52, 53; 257/417, 418, 419

[56] References Cited

U.S. PATENT DOCUMENTS

| | | |
|---|---|---|
| 5,576,250 | 11/1996 | Diem et al. ................................ 438/50 |
| 5,627,317 | 5/1997 | Offenberg et al. ................... 73/514.32 |
| 5,721,377 | 2/1998 | Kurle et al. ........................... 73/504.12 |
| 5,723,353 | 3/1998 | Muenzel et al. ........................... 438/48 |
| 5,752,410 | 5/1998 | Bernstein .............................. 73/514.18 |
| 5,801,070 | 9/1998 | Zanini-Fisher et al. .................. 438/54 |
| 5,804,462 | 9/1998 | Liu et al. .................................. 438/53 |
| 5,894,090 | 4/1999 | Tang et al. ............................ 73/504.02 |

FOREIGN PATENT DOCUMENTS

| | | |
|---|---|---|
| 0 539 393 | 12/1994 | European Pat. Off. . |
| 42 41 045 | 5/1994 | Germany . |
| 43 18 466 | 12/1994 | Germany . |
| 44 19 844 | 12/1995 | Germany . |

*Primary Examiner*—Brian Dutton
*Attorney, Agent, or Firm*—Kenyon & Kenyon

[57] ABSTRACT

A rate-of-rotation sensor includes a three-layer system. The rate-of-rotation sensor and the conductor traces are patterned out of the third layer. The conductor traces are electrically insulated (isolated) by cutouts from other regions of the third layer and by a second electrically insulating layer from a first layer. Thus, a simple electrical contacting (configuration) is achieved that is patterned out of a three-layer system. Since the same etching process is used for the first and the third layer, an especially efficient manufacturing is possible.

14 Claims, 9 Drawing Sheets

METHOD FOR MANUFACTURING A RATE-OF-ROTATION SENSOR

FIELD OF THE INVENTION

The present invention relates to a method for manufacturing a rate-of-rotation (or engine speed) sensor.

BACKGROUND INFORMATION

A method for manufacturing a rate-of-rotation sensor is described in German Patent Application No. 195 30 736.4. The rate-of-rotation sensor is fabricated as a three-layer system. The rate-of-rotation sensor and the conductor traces are patterned (delineated) out of the third layer. The conductor traces are electrically insulated (isolated) by cutouts from other regions of the third layer and by a second electrically insulating layer from a first layer. A dry-etching process is used to pattern the rate-of-rotation sensor and the conductor traces out of the third layer. In addition, the first layer is also thinned (etched down) near the rate-of-rotation sensor. This is effected by a wet-chemical etching, e.g., in a slightly heated potassium hydroxide solution. As necessitated by the etching process, an etching mask made up of a two-layer system of silicon oxide and a nitrite is applied to the first layer, and the two-layer system is then patterned.

SUMMARY OF THE INVENTION

In contrast, an advantage of the method of the present invention is that the rate-of-rotation sensor and the electrical leads are fabricated using a three-layer system, all silicon etching steps being performed with the same etching process. For that reason, the manufacturing process is especially simple and the rate-of-rotation sensor, which includes a suspension mount for an oscillator structure, can be produced cost-effectively.

If a SOI (silicon-on-insulator) layer system is used as the first layer, the benefit is attained that the insulator layer can be drawn upon as an etch barrier (stop). This is advantageous, since the oscillatory masses (resonators or vibrators) approach the setpoint value more closely than when an etching process is used where the etching depth is defined by an etch-duration calibration.

Eliminating the wet-chemical etching process makes it possible for the ablation of the first layer to follow as a last step. This is advantageous since it makes it easier to manipulate the substrate, but had not been possible in known methods heretofore since the etching solution would have affected the third layer.

Moreover, the etching mask can be made of resist or silicon oxide, eliminating the need for an expensive plasma nitration process.

Finally, pattern impurities caused by a liquid etching solution are avoided.

Furthermore, it is not necessary to place the wafers in etching cans for the wet-chemical etching; thus, the need is eliminated for an additional work-intensive process step. To manufacture the acceleration sensor, only three masking steps are necessary in a minimal process.

The conductivity of the conductor traces is advantageously improved since conductive layers are applied in the form of bonding pads and leads to the conductor traces.

It is efficient and, therefore, advantageous to use commercially available silicon-on-insulator (SOI) layer systems as substrates.

Since well developed and simple methods for anisotropic etching are available a silicon-silicon-oxide-silicon substrate can be advantageously used.

It is also advantageous to ablate the insulator layer after the first layer has been removed, since this reduces the internal mechanical stresses in the three-layer structure that makes up the first layer. This prolongs the sensor's service life and decreases the fluctuations in the natural frequency of the oscillatory mass.

BRIEF DESCRIPTION OF THE DRAWINGS

FIG. 3 shows a first method for manufacturing a rate-of-rotation sensor according to the present invention.

FIG. 4 shows a second method for manufacturing the rate-of-rotation sensor according to the present invention.

FIG. 5 shows a third method for manufacturing the rate-of-rotation sensor according to the present invention.

FIG. 6 shows a fourth method for manufacturing the rate-of-rotation sensor according to the present invention.

FIG. 7 shows a fifth method for manufacturing the rate-of-rotation sensor according to the present invention.

DETAILED DESCRIPTION

Figure 1:
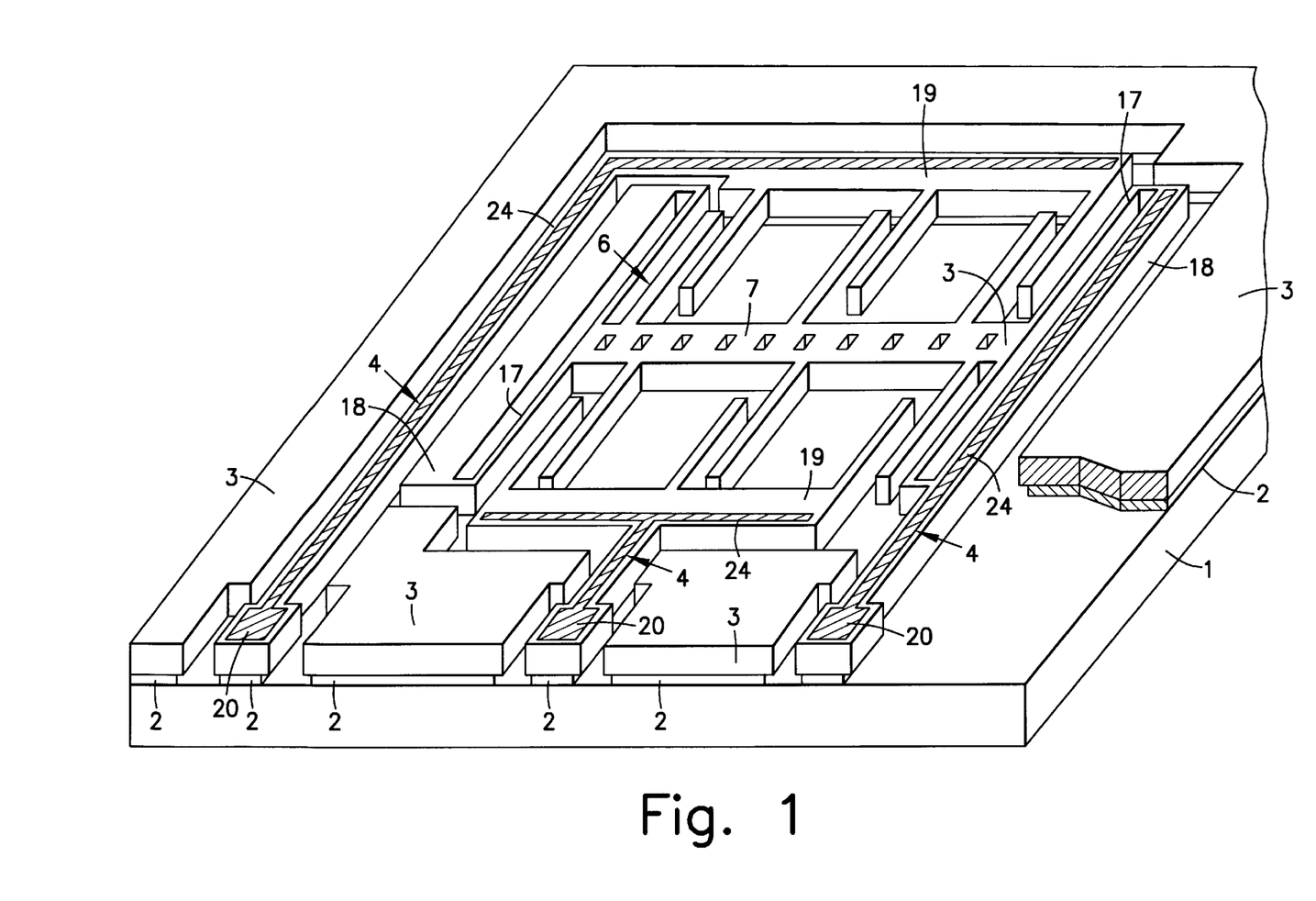
FIG. 1 shows an acceleration sensor according to the present invention.

FIG. 1 shows an acceleration sensor 6 which is composed of a three-layer system. In this embodiment of the present invention, a silicon-on-insulator (SOI) layer system is used. However, other three-layer systems are also conceivable, it being necessary for the top-most layer to be patternable and the middle layer to be patternable and laterally etchable and insulating.

A first layer 1 that is made of silicon is used as a bearing plate. Applied to first layer 1 is a second layer 2, made of silicon oxide. The third layer 3 is likewise made of silicon. Patterned out of the middle of third layer 3 is a deflectable mass 7, which includes an oblong support having three plates on each of the two longitudinal sides. The plates are arranged perpendicularly to the longitudinal direction of the support. In the longitudinal direction of the support, deflectable mass 7 is deflectably joined at each end via a bending segment 17 to a carrier 18. Carriers 18 are securely joined via second layer 2 to first layer 1. Second layer 2 is ablated from beneath deflectable mass 7 and bending segments 17. In the case of $SiO_2$, this is carried out using etching processes, as described in German Patent Application No. 44 19 844.

Patterned in each case out of third layer 3 (in parallel with the support of deflectable mass 7) is an oblong retention bar 19 having three plates that are aligned perpendicularly to the support of deflectable mass 7. Retention bars 19 are securely joined via second layer 2 to first layer 1. The plates of a retention bar 19 are disposed in each case to the right of the plates of deflectable mass 7. The plates of the other retention bar 19 are arranged in each case to the left of the plates of deflectable mass 7. At this point, if deflectable mass 7 is displaced (travels out), then the distances between the plates arranged on one side of deflectable mass 7 and the plates of the retention bar 19 decrease and, at the same time, the distances between the plates arranged on the other side of deflectable mass 7 and the plates of the second retention bar 19 increase. A conductor trace 4 is routed from each of two retention bars 19 to a common edge of the acceleration sensor 6. Conductor traces 4 are patterned out of third layer 3 and electrically insulated by second layer 2 from first layer 1. Conductor traces 4 are electrically isolated by cutouts from other regions of third layer 3. In the same way, a conductor trace 4 is brought out from deflectable mass 7 to one edge of the acceleration sensor 6, which is patterned out of third layer 3 and is electrically insulated by second layer 2 from first layer 1 and is likewise electrically isolated by cutouts 10 from other regions of third layer 3. Through formation of cutouts 10 and the use of second layer 2 as an insulating layer, conductor traces 4 for contacting the acceleration sensor can be configured in third layer 3.

Another improvement in the conductivity of conductor traces 4 is achieved in that a conductive layer 24 is applied to conductor traces 4. As a conductive layer, a metal such as, e.g., aluminum can be used. Two measuring signals are obtained by the fact that when deflectable mass 7 is displaced, the distances from plates of deflectable mass 7 to plates of a retention bar 19 are reduced, and to plates of the other retention bar 19 are increased. The two measuring signals are evaluated and, on the basis of the change in the capacitances between the plates of deflectable mass 7 and the plates of retention bars 19, the deflection of deflectable mass 7 and, thus, the acting force is calculated. Conductor traces 4 are routed to contact points 20. The measuring signals from the acceleration sensor are tapped off at contact points 20.

German Patent Application No. 44 19 844 describes an acceleration sensor where each movable plate is disposed between two stationary plates. Sensors of this kind can only be realized when conductor crossovers are possible. Conductor crossovers of this kind are associated with a substantial outlay in the manufacturing of the sensors. With the sensor according to the present invention, no conductor crossovers whatsoever are needed, since each movable plate, which is suspended on deflectable mass 7, has only one stationary plate assigned to it. The individual regions are isolated from one another solely by the etching of trenches into top layer 3. The insulation from bottom layer 1 is assured by dielectric intermediate layer 2. It is especially simple to produce sensors of this kind.

Figure 2:
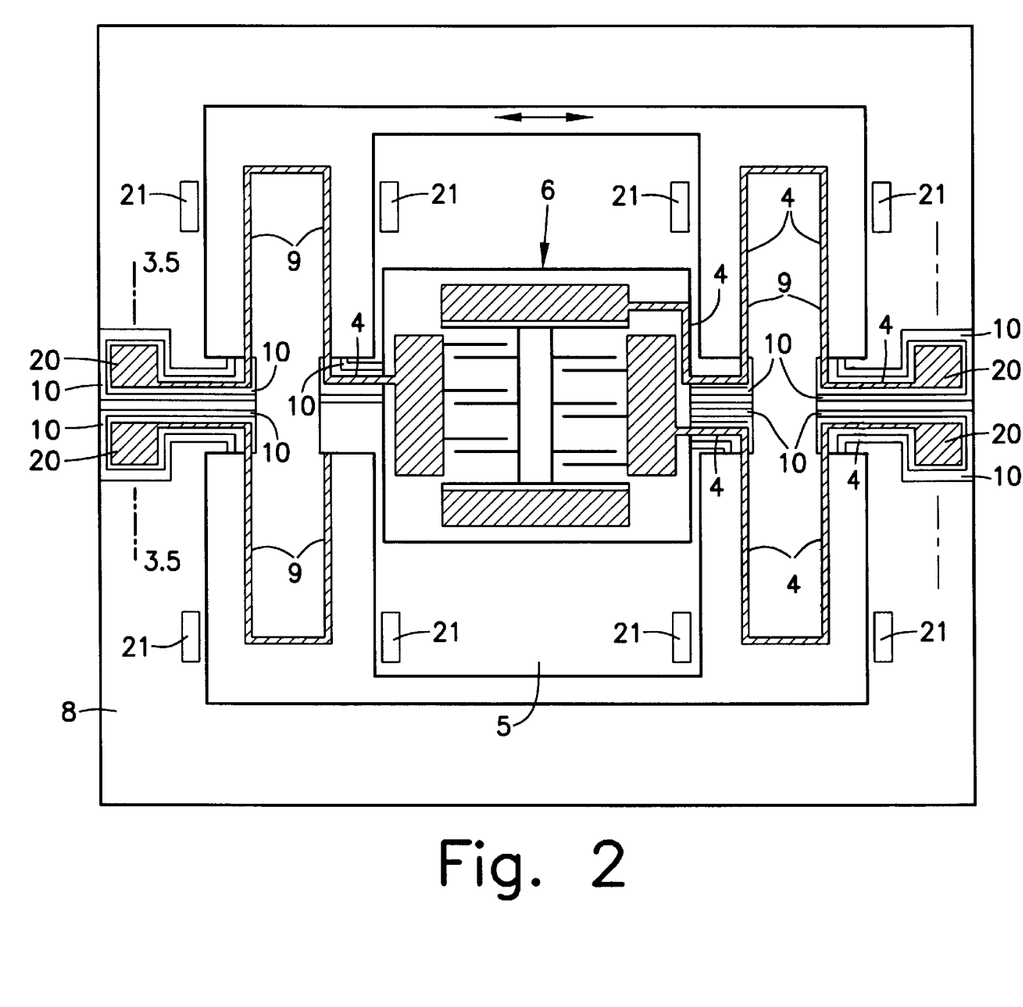
FIG. 2 shows a rate-of-rotation sensor according to the present invention.

FIG. 2 shows a rate-of-rotation sensor having a frame 8, in which an oscillatory mass 5 is mounted using ribs (stepped features) 9 so as to permit vibration. Oscillatory mass 5 is excited by driving (exciter) means 21 into a linear vibration. Electric, magnetic, or piezoelectric drives may be used, for example, as driving means. Suitable driving means are described, for example, in European Patent Application No. 53 93 93. An acceleration sensor 6 is placed upon oscillatory mass 5 as illustrated in FIG. 1. Acceleration sensor 6 is arranged in the direction shown, normal to the vibration direction of oscillatory mass 5. Conductor traces 4, which originate with the retention bars and deflectable mass 7, are routed via ribs 9 to frame 8. The sensor includes a first, a second, and a third layer in conformance with the acceleration sensor. Conductor traces 4 are patterned out of third layer 3. Conductor traces 4 are electrically isolated in the frame 8 by cutouts 10 from third layer 3 of frame 8. In addition, conductor traces 4 are electrically insulated by second layer 2 of frame 8 from first layer 1 of frame 8.

Ribs 9 are patterned out of top layer 3, as well as out of bottom layer 1, as shown in FIGS. 3 and 4. Conductor traces 4 disposed on edge 8 pass over into ribs 9, so that the acceleration sensor arranged on oscillatory mass 5 is electrically contacted using ribs 9. Isolation trenches 10 are provided in top layer 3 on oscillatory mass 5, in the region into which ribs 9 lead, thus assuring here as well, an electrical isolation of the signals which are routed via ribs 9 to or from oscillatory mass 5.

In this manner, it is possible to design a rate-of-rotation sensor without necessitating a costly electrical contacting of the acceleration sensor. Because conductor traces 4 are routed in an electrically insulated (isolated) manner right into frame 8, a simple electrical contacting of conductor traces 4 in frame 8 can take place. A further advantage lies in that the rate-of-rotation sensor is patterned in one process with the acceleration sensor out of a three-layer system, preferably of a silicon-on-insulator layer.

Figure 31:
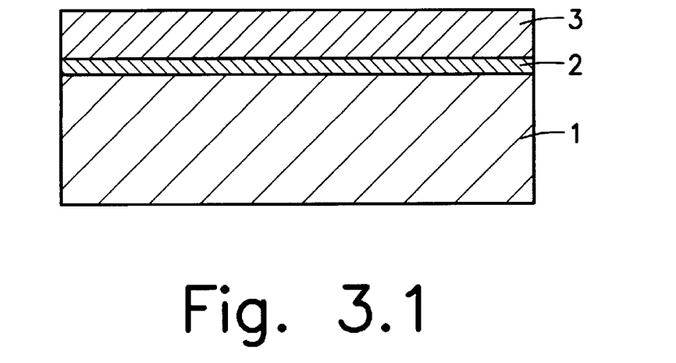

FIG. 3 illustrates steps of a method for fabricating a rate-of-rotation sensor according to the present invention. FIG. 3.1 shows a three-layer system including a first layer 1, on which a second layer 2 is deposited. A third layer 3 is arranged on second layer 2. First layer 1 is made of silicon, second layer 2 of silicon oxide, and third layer 3, in turn, of silicon. However, other three-layer systems can also be used, which are able to be selectively ablated, such as $SiO_2$, $Si_3N_4$, $Al_2O_3$ polyimide, teflon, and Si-carbide. As a starting material, for example, a silicon-on-insulator (SOI) wafer is used, third layer 3 including a p++ or n++ doped silicon and having a thickness of about 15 μm. Second layer 2 is made of silicon oxide and has a thickness in the μm range. First layer 1 is constituted of a silicon wafer. It is typically 500 micrometers thick. Thinner wafers are, in fact, to be preferred, but pose handling problems because of their instability. In the same way, epi-poly wafers can also be used. Their fabrication and suitability for use in sensors has already been described in German Patent Application No. 43 18 466. For third layer 3, a heavily p- or n-doped silicon layer is used, which is deposited on a few μm thick silicon-oxide layer as a second layer 2. The epi-polysilicon layer may be, e.g., approximately 12 μm thick.

Aluminum is applied through vapor or sputter deposition to third layer 3 on the SOI wafer or epi-poly wafer in the regions of the conductor traces. The deposited aluminum is patterned using photolithographic steps and etching processes in the form of conductor traces 4 as conductive layer 24.

Figure 32:
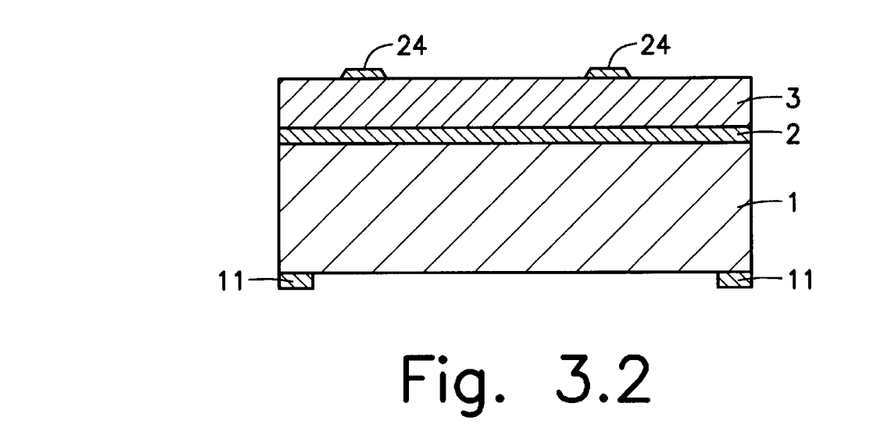

A resist is subsequently applied to first layer 1 and is ablated again in a predefined region where oscillatory mass 5 is to be constructed. Thus, the patterned first coating layer 11 is formed. This is shown in FIG. 3.2.

Figure 33:
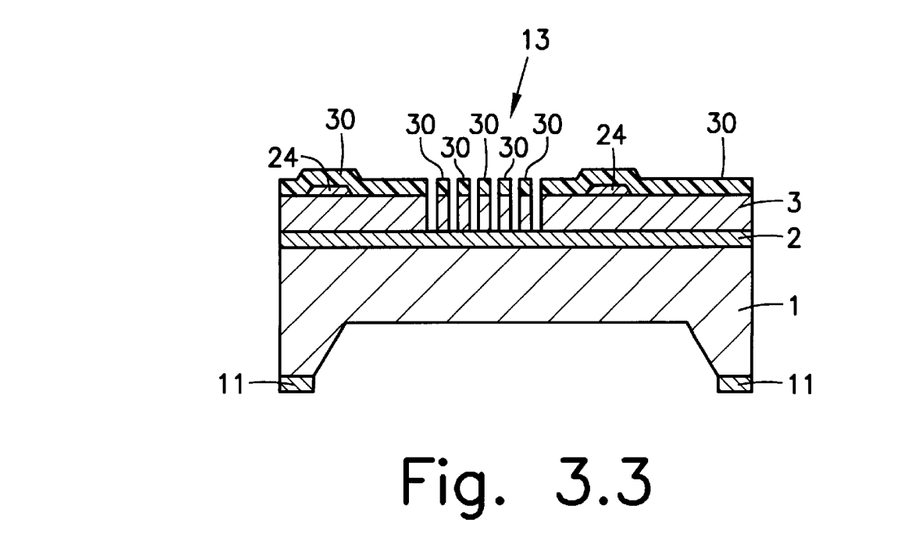

Resist 30 is then applied to third layer 3 and patterned in conformance with a comb-shaped structure of a rate-of-rotation sensor. The comb-shaped structure of the rate-of-rotation sensor is subsequently etched into third layer 3. In this context, an anisotropic silicon etching method is used, which is described in German Patent Application No. 42 41 045. As a result, comb-shaped structures having a large aspect ratio are produced. First layer 1 is then ablated in a dry-etch process to a residual thickness of about 100 μm, as shown in FIG. 3.3. The dry-etch process essentially corresponds to that used in the fabrication of the comb-shaped structures.

Figure 34:
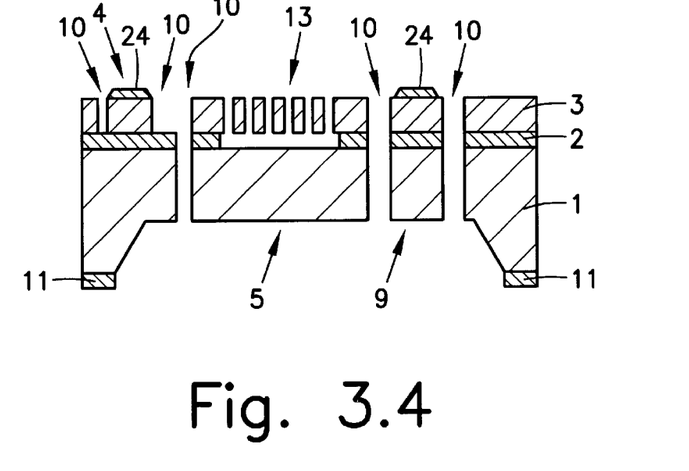

Second layer 2, which is made of silicon oxide and is used as sacrificial oxide underneath comb-shaped structure 13 of the rate-of-rotation sensor, is then etched. By this means, one obtains a comb-shaped structure 13, which is secured to second layer 2 in a manner that permits deflection (excursion). These comb-shaped structures 13 represent the rate-of-rotation sensor illustrated in FIG. 1. To improve the clarity of the illustration, the actual structure of the rate-of-rotation sensor is only generally illustrated in FIG. 3. In the next fabrication step, second layer 2 is removed from underneath comb-shaped structures 13. Thus, movable structures are created, which are suited for the rate-of-rotation sensor. However, because of the sizable lateral dimensions, second layer 2 is not removed from underneath other regions of top layer 3. Resist layer 30 is then ablated in a further step, and a new resist layer 30 is applied and patterned. The pattern in this new resist layer is used to etch in trenches, which extend both through top layer 3, second layer 2, and first layer 1. Thus, these etched-in trenches can be used to etch ribs 9 and an oscillatory mass 5 out of the multi-layer substrate, as shown in FIG. 3.4. The dimensions of oscillatory mass 5 are defined by the introduced trenches 10. Comb-shaped structures 13 of the acceleration sensor are applied to oscillatory mass 5. Also shown is a rib 9, whose geometric dimensions are likewise defined by trenches 10. The etching in of trenches 10 takes place in a multi-step process. First, top layer 3 is patterned, for example, in a fluoroplasma. Second layer 2 is patterned in a further etching step, for example in a chlorine-containing plasma. First layer 1 is patterned in another etching step, for example again in a fluoroplasma. The resist layer, which is used as an etching mask for this process, is subsequently removed again.

FIG. 3.4 is a simplified illustration and does not necessarily represent a cross-section through an actual rate-of-rotation sensor. However, since all the elements of a rate-of-rotation sensor illustrated in FIG. 2 are shown, such as ribs 9, an oscillatory element 5, comb-shaped structures for an acceleration sensor 13, the rate-of-rotation sensors shown in FIG. 2 can be manufactured using the sequence of process steps shown. Conductor traces 4, which are only patterned out of top silicon layer 3, are shown in the edge area. These can be produced, for example, in the same process step as comb-shaped structures 13. It must be assured then, however, through sizable lateral dimensions of conductor traces 4, that undercut etching is performed on second layer 2 situated underneath conductor traces 4. Alternatively, after comb-shaped structures 13 have been produced, it is also possible to deposit and pattern a further resist layer, which is then used exclusively to produce conductor trace patterns 4. However, this increases the degree of complexity required to manufacture the sensors. The purpose of the rear-side etching of layer 1 shown in FIG. 3.3 is to thin (etched down) bottom silicon layer 1 in the region of resonator 5 or of ribs 9. This measure reduces the etching time required to completely etch trenches 10 through layer 1.

Figure 35:
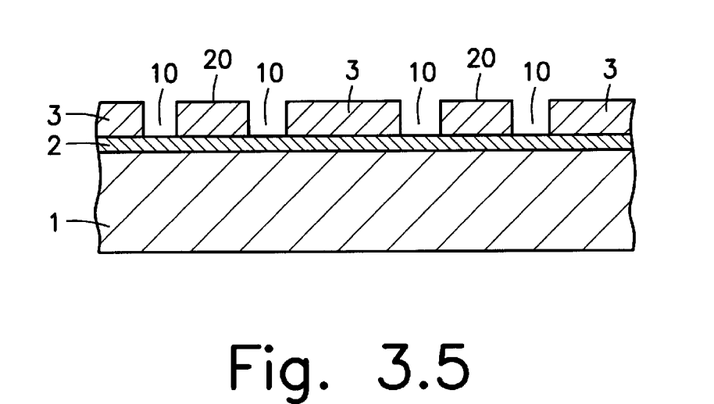

FIG. 3.5 shows a cross-section 3.5—3.5 through frame 8 in the region of connections 20. Clearly revealed is the electrical isolation of connections 20 by way of cutouts 10 from third layer 3 of frame 8.

Figure 36:
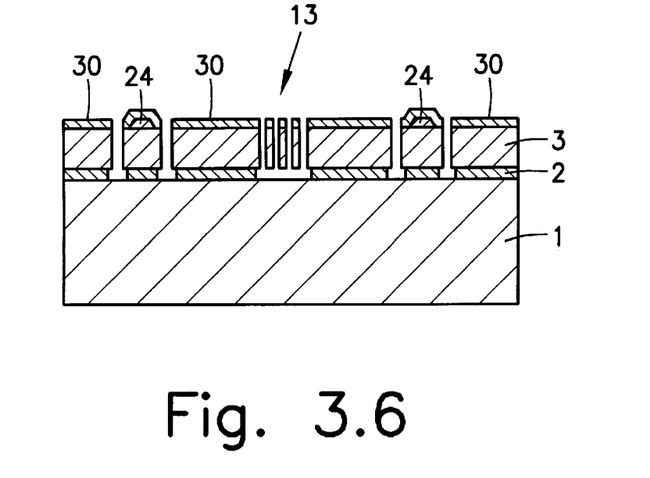
Figure 41:
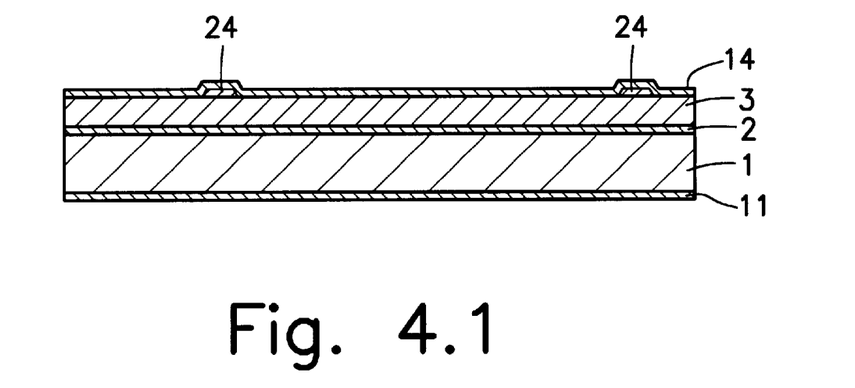
Figure 42:
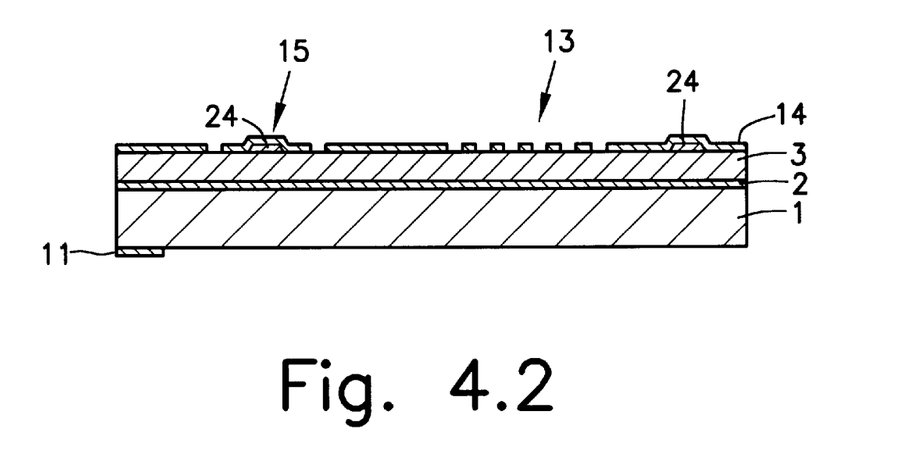

Another embodiment of the method for fabricating a rate-of-rotation sensor according to the present invention is shown in FIG. 3.6. In this context, the need is eliminated for all steps for patterning layer 1. Starting from the structure shown in FIG. 3.2 and described with respect to FIG. 3.3, a resist layer 30 is deposited on the surface and patterned through a photomask. An etching step follows then, for example, in which trenches 10 are introduced into upper silicon layer 3 using a fluoroplasma etching process. These trenches 10 extend to second layer 2. In a subsequent etching step, second layer 2 made of silicon oxide is etched. This can take place, for example, in an aqueous hydrofluoric acid solution or in a hydrofluoric acid-containing gas. This etching step completely ablates the second layer 2 from underneath the finely etched-in trench patterns for comb-shaped structures 13. The patterns for conductor traces 4, whose lateral extent (or dimensions) is comparatively large, remain, however, securely and mechanically joined via second layer 2 to first layer 1. Since photomask 30 can remain on the surface during this etching step, metallization patterns 24, for example, are also protected from an attack (or corrosion) by the etching medium, so that they may also be made of aluminum. This process for manufacturing rate-of-rotation sensors is distinguished since a small number of process steps is necessary. As a result, it is possible to manufacture rate-of-rotation sensors efficiently and cost-effectively.

Figure 43:
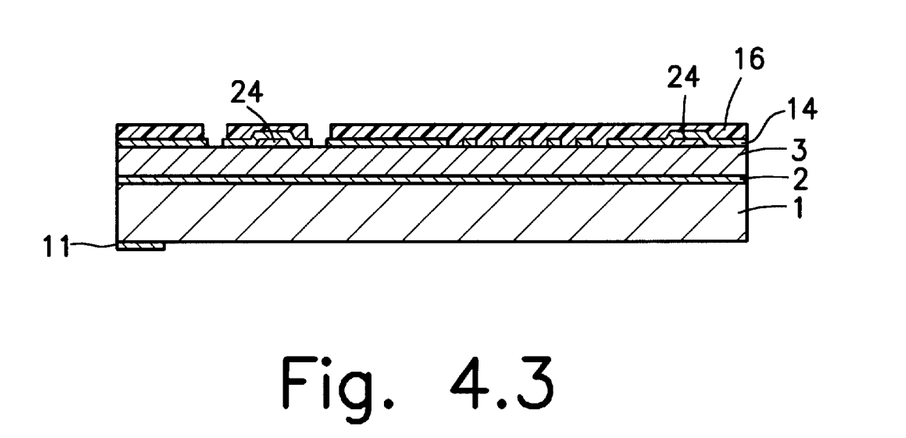
Figure 44:
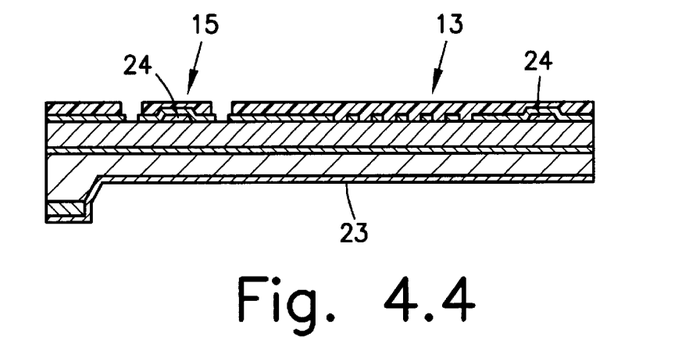

FIG. 4 illustrates another method for manufacturing a rate-of-rotation sensor according to the present invention. In this context, a three-layer system is used, which includes a first layer 1, a second layer 2, and a third layer 3. First layer 1 is made of silicon, second layer 2 of silicon oxide, and third layer 3 of heavily p- or n-doped silicon. The described three-layer system constitutes a silicon-on-insulator structure. Metal conductor traces 24 are applied to third layer 3, preferably in the regions of conductor traces 4. This is done using a sputter or vapor deposition process and through subsequent patterning. A third coating layer 14 of silicon oxide is then deposited on metal conductor traces 24 and third layer 3. A first coating layer 11 of resist is applied to first layer 1 and patterned. Third coating layer 14 is subsequently patterned to conform with comb-shaped structure 13 of the acceleration sensor, and with the form of conductor traces 4 and of ribs 9. A fourth coating layer 16 in the form of a resist is deposited on the patterned third coating layer 14. Fourth coating layer 16 is removed in the form of ribs 9, as shown in FIG. 4.3. First layer 1 is then etched down within frame 8 to a predefined thickness of 100 μm and coated with a passivation layer 17, as shown in FIG. 4.4.

Figure 45:
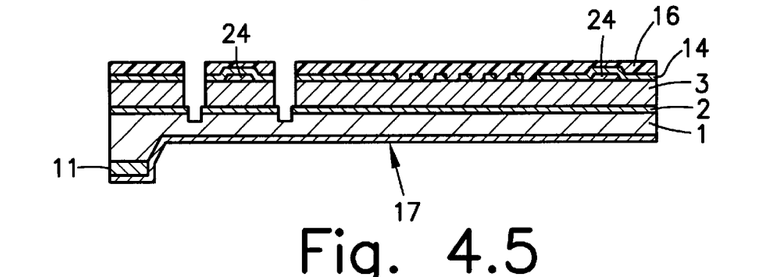
Figure 46:
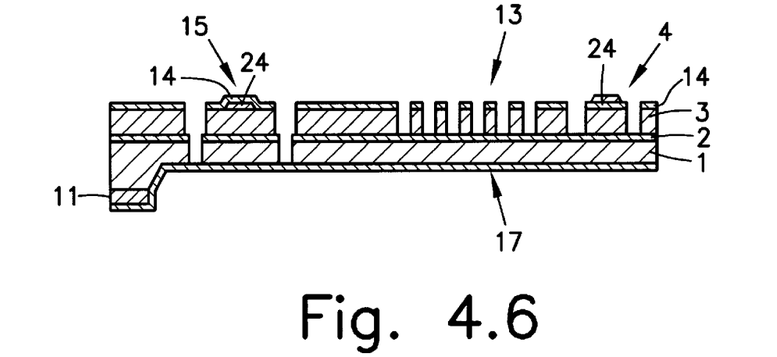
Figure 47:
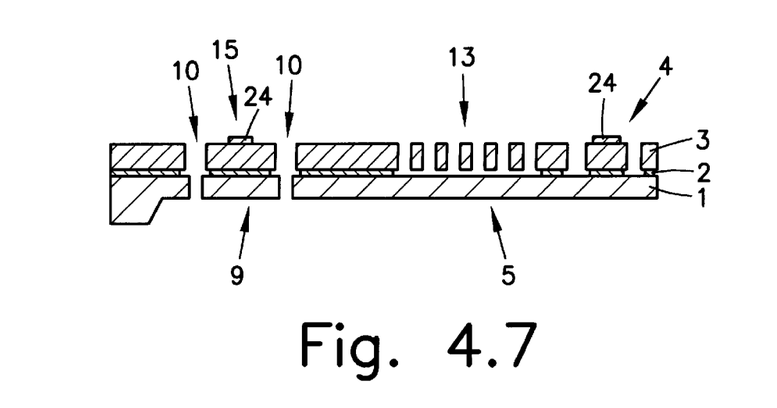

Trenches are subsequently introduced in an etching process. Since the patterned fourth coating layer 16 serves as an etching mask for these trenches, initially only the geometric form of ribs 9 is etched in. The etching of these trenches continues until layers 3 and 2 are completely penetrated and a portion of layer 1 is likewise etched through. The etching into layer 1 continues until the residual thickness approximately corresponds to the thickness of layer 3, as shown in FIG. 4.5. Fourth coating layer 16 is subsequently removed and the etching process is continued. This time, the patterned, third coating layer 14 functions as an etching mask which contains the patterns for ribs 9, comb-shaped structures 13, and conductor traces 4. In this context, the etching process used only etches the silicon materials of layers 3 and 1, but not layers 2 or 17. The etching is then continued until the trenches for ribs 9, passivation layer 17, and the trenches for comb-shaped structures 13 or conductor traces 4 reach second layer 2. Second layer 2 is then etched away from underneath comb-shaped structure 13. In this context, ribs 9 are simultaneously etched out of second layer 2. However, ribs 9 are configured to be wide enough to be securely joined via a second layer 2 to first layer 1. Passivation layer 23 is subsequently etched off. In this manner, one obtains a rate-of-rotation sensor as shown in FIGS. 2 and 4.7.

Another embodiment of the method for manufacturing a rate-of-rotation sensor according to the present invention is shown in FIG. 5. This method starts out from a silicon substrate 1, on to which an etchable layer 2 is applied (e.g., silicon oxide). A polysilicon starting layer 40 can also be optionally applied to layer 2. This second layer 2 is then patterned as, in some instances, the polysilicon starting layer 40 that may be deposited thereon. Another silicon layer 2 is then produced using a deposition process. A further silicon layer 3 can then be deposited in an epitaxial reactor, as described in German Patent Application No. 43 18 466. In those regions where layer 3 comes to rest directly on silicon substrate 1, silicon layer 3 grows as a monocrystalline silicon layer. In the other regions, polysilicon starting layer 40 serves as a starting layer for growing a polycrystalline silicon layer, as shown in FIG. 5.2. Through the application of etching masks and etching steps, trench patterns are then introduced into top silicon layer 3 and into the polysilicon starting layer, and extend to second layer 2. They then form again comb-shaped structures 13 for an acceleration sensor. In addition, starting from the rear side, a cutout is etched in to reduce the thickness of first silicon layer 1. This can be done in a similar manner using a dry etching process, as described above to form a pattern shown in FIG. 5.3. FIG. 5.4 shows how trench patterns 10 are then introduced, which extend through top layer 3, polysilicon layer 40, second layer 2, and first layer 1. Thus, a resonator 5 and a rib 9 are formed. The etching process used essentially only etches silicon. Therefore, top layer 3 and bottom layer 1 are etched. Since the masking for these trench patterns 10 is selected so as to allow them to be situated above the already produced patterns of second layer 2, the entire substrate can be etched through using an etching process of this kind. In this context, however, only the dimensions of top layer 3 are controlled by the etching mask. The geometric dimensions in bottom layer 1 are determined by the patterns already introduced into layer 2, since the patterned layer 2 is used as an etching mask for etching subjacent layer 1, which can also be utilized to compensate for errors in the adjustment of the etching mask relative to the patterns in layer 2. Therefore, the geometric dimensions of the etching mask for trenches 10 are selected to be somewhat larger than the patterns in layer 2.

Figure 51:
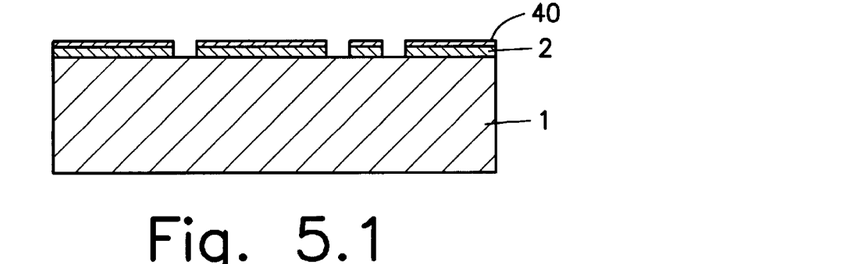

The essential part of this process is that the accuracy of the patterning of first layer 1 is, for the most part, a function of the accuracy of the patterning of layer 2, as shown in FIG. 5.1. The patterning of layer 2 shown in FIG. 5.1 can take place with an especially high precision, so that the geometric dimensions of oscillatory element 5 or of rib 9, to the extent first layer 1 is concerned, are also very precise. Since the thickness of top layer 3 is on the order of 10 $\mu$m and of bottom layer 1 on the order of 50 $\mu$m, the essential geometric dimensions of resonator 5 and of ribs 9 are, thus, produced with an especially high precision. Furthermore, it is advantageous that by the pre-patterning of layer 2, the process of etching trenches 10 can be performed in one single process step. By this means as well, the manufacturing of the patterns is simplified.

The etching processes shown in FIGS. 5.3 and 5.4 are carried out either using a plurality of resist masks, as had already been described with respect to FIG. 3, or using a plurality of superposed masks, as had already been described with respect to FIG. 4.

As also described with respect to FIG. 5.1 that the likewise deposited polysilicon starting layer 40 is patterned. In this case, top silicon layer 3 has monocrystalline silicon regions. Alternatively, it is also possible to first apply polysilicon starting layer 40 after second layer 2 has already been patterned. In this case, top silicon layer 3 grows completely as a polycrystalline silicon layer.

Figure 54:
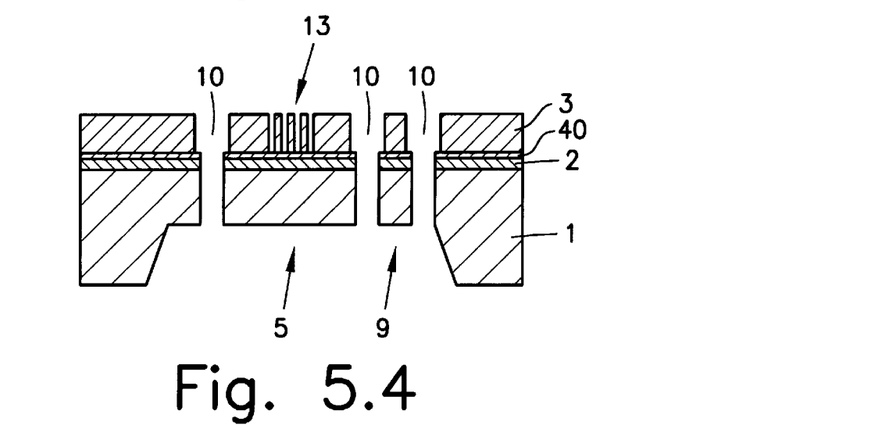

Following the processing status shown in FIG. 5.4, second layer 2 is then also etched to allow an undercut etching of comb-shaped structures 13.

Another method for manufacturing a rate-of-rotation sensor according to the present invention is illustrated in FIG. 6, with a point of departure being a substrate, as shown in FIG. 5.2. An etching mask 41, of silicon oxide for example, is then applied. However, other etching masks, such as of photoresist, are also conceivable. Etching mask 41 has patterns 42, which extend all the way to silicon layer 3. Provision is also made for trenches 43, which do not extend fully to layer 3. Patterns 42 are provided at those locations where the intention is to completely etch through the substrate to the rear side. Patterns 43 are provided where the intention is only to etch top silicon layer 3. By etching the substrate shown in FIG. 6.1, the rate-of-rotation sensor is then produced, as illustrated in FIG. 5.4. FIG. 6.2 shows an intermediate step in this etching process. An etching process is used where masking layer 41 is also ablated. Alternatively, it is also possible to use intermediate etching steps to remove masking layer 41. Because certain regions of the silicon surface are exposed right from the start, these regions are etched more quickly than those regions which are first exposed during the course of the etching process, as shown in FIG. 6.2. Trenches 10, which correspond to patterns 42 of the etching mask, are driven in this intermediate etching step already completely through top silicon layer 3, and a bit into first silicon layer 1. However, comb-shaped structures 13, which correspond to patterns 43 in etching mask 41, are only driven a little bit into top silicon layer 3. Continuing the etching process forms the pattern shown in FIG. 5.4.

Figure 61:
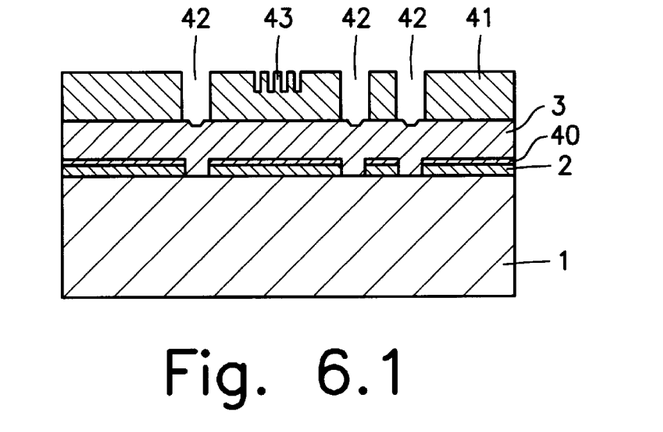
Figure 62:
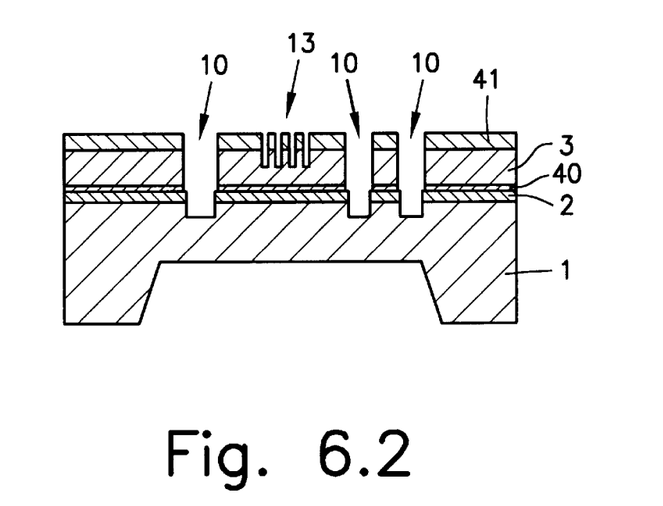

Etching mask layer 41 can be fabricated, for example, using a two-step method for producing an etching mask layer of silicon oxide. For that, a silicon layer is first deposited over the entire surface. Treatment then follows with a first resist mask to etch in patterns 43. After that, a second resist mask is applied, and patterns 42 are etched in. The resist masks are then removed to reveal the two-stage etching layer shown in FIG. 6.1.

The advantage of this method is that once etching mask 41 is produced, no further resist processes are needed at the top. Since such resist processes are always associated with a certain endangerment to already introduced patterns, process integrity is improved.

Another advantageous embodiment of the method according to the present invention is shown in FIGS. 7.1–7.4. It differs from the method described with respect to FIGS. 5.1–5.4 in the use of the SOI layer system as a first layer. In this case, the first layer is formed from a first silicon layer 100, an oxide 101, and a second silicon layer 102. Another difference lies in a use of a two-layer mask.

Figure 71:
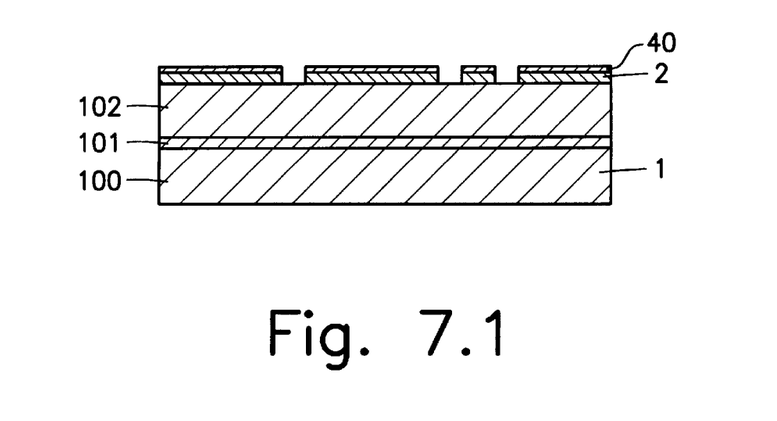

Initially, a first layer 1 is provided, which includes a first silicon layer 100, an oxide 101, and a second silicon layer 102. In a manner as described above with respect to FIG. 5.1, the second layer, which here includes the two layers 40, 2, is applied and patterned. The intermediate product is shown in FIG. 7.1.

Figure 52:
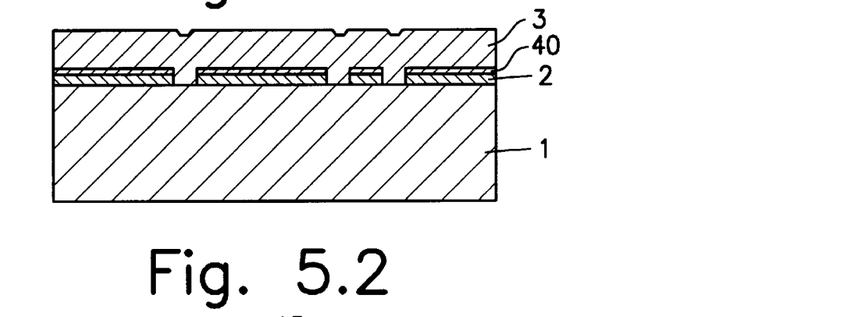
Figure 53:
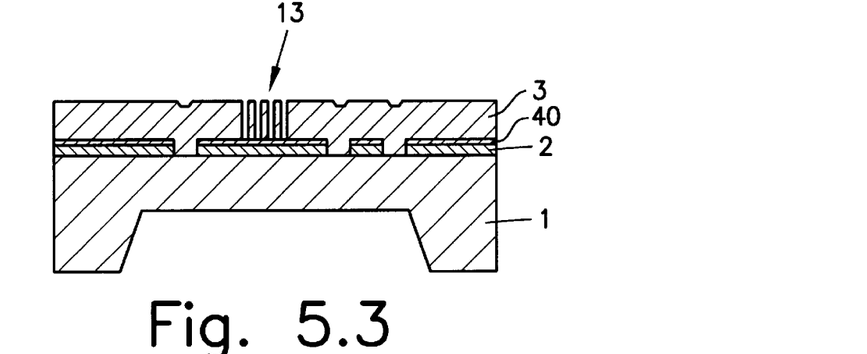
Figure 72:
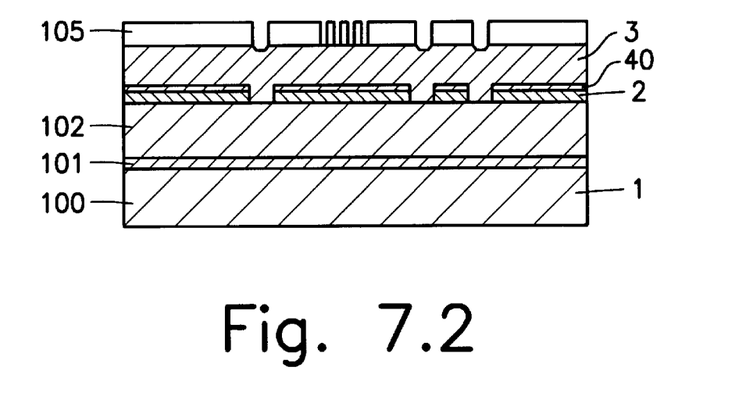

In a manner described above with respect to FIG. 5.2, third layer 3 is deposited and provided with a hard oxide mask 105. Hard oxide mask 105 contains vias (windows or featured holes) for the comb-shaped structure and for the trench patterns, as shown in FIG. 7.2.

Figure 73:
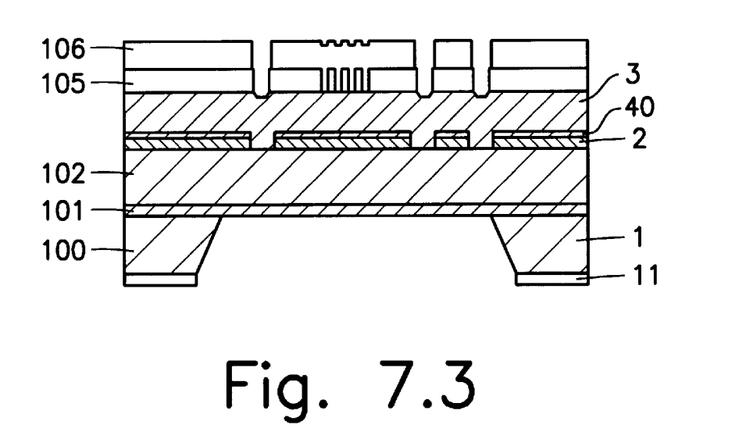

A second mask 106, which is made of photoresist and contains vias for the trench pattern, is then applied. Also placed on the rear side of the first layer is a masking 11 including a via, which at the least encompasses the lateral dimensions of the oscillatory mass. First layer 1 is then ablated, again using potassium-hydroxide or dry etching, oxide 101 of the SOI layer system being used as an etch barrier. Thus, the ablation of the first layer essentially takes place in silicon 100. This renders possible highly precise etching depths and a very exact dimensioning (sizing) of the oscillatory mass. The intermediate product formed following ablation of first layer 1 (right through) to oxide 101 is shown in FIG. 7.3.

Figure 74:
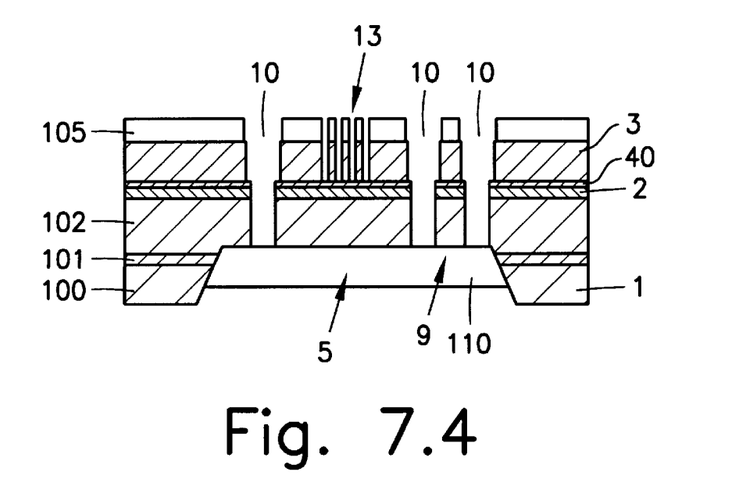

The rear-side masking is then ablated, which (depending on the etching process) is comprised of resist or oxide, or oxide with silicon nitride (the latter double mask is used in KOH etching), together with the exposed part of oxide 101. To maintain stability, the area of ablation of the first layer is partially filled with a resist 110, which is soluble in a different solvent than the resist of second mask 106 on third layer 3. Finally, starting from third layer 3, trench patterns 10 are worked out of the third, second, and first layer and, following ablation of resist mask 106, comb-shaped structure 13 is etched on the front side. Both etching processes are advantageously carried out as dry etching. FIG. 7.4 shows the component in this stage.

Two further process steps are still needed to obtain the final sensor structure. However, they will not be disclosed here, since they have already been described in connection with previous exemplary embodiments.

It is a question first of all here of ablation of resist 110, for example using a stripping process. Second layer 2 is also removed in a last step from underneath comb-shaped structure 13 by a vapor (gas) phase etching process. At the same time, this step also eliminates the need for hard oxide mask 105. This process also offers the possibility, through the exclusive use of dry etching, to change the order of the steps, which can also be advantageous.

What is claimed is:

1. A method for manufacturing a rate-of-rotation sensor having an oscillator structure and being at least partially configured as an acceleration sensor, the rate-of-rotation sensor including a comb-shaped structure, a suspension mount for the oscillator structure and a substrate, the substrate including a first layer, a second insulating layer and a third layer, the method comprising the steps of:

patterning the comb-shaped structure and conductor traces from the third layer;

after patterning the comb-shaped structure, at least partially etching the second insulating layer which is provided underneath the comb-shaped structure;

removing at least a portion of a passivation layer on the first layer in a region where the oscillator structure is to be patterned;

ablating the first layer to a particular thickness using a dry etching process in the region where the oscillator structure is to be patterned; and patterning the oscillator structure from the first, the second insulating, and the third layers.

2. The method according to claim 1, wherein the conductor traces are securely joined to the second insulating layer and are routed from the comb-shaped structure to the suspension mount.

3. The method according to claim 1, further comprising the step of:

depositing conductive layers on the conductor traces.

4. The method according to claim 1, wherein the substrate is composed of a silicon-on-insulator (SOI) layer system.

5. The method according to claim 4, wherein the first layer is composed of silicon, the second insulating layer is composed of silicon oxide, and the third layer is composed of silicon.

6. The method according to claim 1, wherein the first layer is composed of a silicon-on-insulator (SOI) three-layer system, the second insulating layer is composed of an oxide, and the third layer is composed of a silicon.

7. The method according to claim 6, wherein the first layer is used as at least one of the oxide and an etching barrier.

8. A method for manufacturing a rate-of-rotation sensor having an oscillator structure and being at least partially configured as an acceleration sensor, the rate-of-rotation sensor including a comb-shaped structure, a suspension mount for the oscillator structure and a substrate, the substrate including a first layer, a second insulating layer and a third layer, the method comprising the steps of:

patterning the comb-shaped structure and conductor traces from the third layer;

after patterning the comb-shaped structure, at least partially etching the second insulating layer which is provided underneath the comb-shaped structure;

removing at least a portion of a passivation layer on the first layer, the first layer being a silicon-on-insulator (SOI) three-layer system, in a region where the oscillator structure is to be patterned;

ablating the first layer to a particular thickness using one of a wet-chemical etching process and a dry etching process in the region where the oscillator structure is to be patterned; and after ablating the first layer, patterning the oscillator structure from the first, the second insulating, and the third layers.

9. The method according to claim 8, wherein the SOI three-layer system includes an oxide being used as an etch barrier for ablating the first layer.

10. The method according to claim 8, wherein the SOI three-layer system includes an oxide being used as an etch barrier for forming trench patterns.

11. The method according to claim 8, wherein the SOI three-layer system includes an oxide being ablated in a proximity of an oscillatory mass.

12. The method according to claim 8, wherein the step of ablating the first layer is performed using the wet-chemical etching process.

13. The method according to claim 12, wherein potassium hydroxide is used in the wet-chemical etching process.

14. The method according to claim 8, wherein the step of ablating the first layer is performed using the dry etching process.

* * * * *